(12) United States Patent
Krawczyk

(10) Patent No.: US 9,199,269 B2
(45) Date of Patent: Dec. 1, 2015

(54) PIPE PAINTING PROCESS

(71) Applicant: Arthur Mark Krawczyk, Edmonton (CA)

(72) Inventor: Arthur Mark Krawczyk, Edmonton (CA)

(*) Notice: Subject to any disclaimer, the term of this patent is extended or adjusted under 35 U.S.C. 154(b) by 0 days.

(21) Appl. No.: 14/181,397

(22) Filed: Feb. 14, 2014

(65) Prior Publication Data

US 2015/0231667 A1 Aug. 20, 2015

(51) Int. Cl.
| | |
|---|---|
| B05D 7/22 | (2006.01) |
| B05D 1/38 | (2006.01) |
| B05D 1/00 | (2006.01) |
| B05D 1/02 | (2006.01) |
| B05D 3/02 | (2006.01) |
| B05D 7/14 | (2006.01) |
| F16L 9/14 | (2006.01) |

(52) U.S. Cl.
CPC *B05D 1/38* (2013.01); *B05D 1/002* (2013.01); *B05D 1/02* (2013.01); *B05D 3/0209* (2013.01); *B05D 3/0254* (2013.01); *B05D 7/14* (2013.01); *F16L 9/14* (2013.01)

(58) Field of Classification Search
CPC ............ B05B 13/0609; B05B 13/0627; B05B 13/0636; B05B 15/008; B05B 15/04
USPC .......................................... 427/233, 236, 239
See application file for complete search history.

(56) References Cited

U.S. PATENT DOCUMENTS

| | | |
|---|---|---|
| 1,755,877 A | 4/1930 | Janes |
| 3,166,440 A | 1/1965 | Carmichael et al. |
| 3,294,573 A | 12/1966 | Michael et al. |
| 4,505,957 A | 3/1985 | Cobbs, Jr. et al. |
| 5,309,403 A | 5/1994 | Bartow |
| 6,811,806 B2 | 11/2004 | Droski |
| 7,936,982 B2 | 5/2011 | Milli |

FOREIGN PATENT DOCUMENTS

| | | |
|---|---|---|
| AU | 2009101353 A4 | 6/2011 |
| CA | 1137043 A1 | 12/1982 |
| CA | 2065817 A1 | 11/1992 |
| GB | 829387 A | 3/1960 |
| GB | 909524 A | 10/1962 |

*Primary Examiner* — Tan N Tran
(74) *Attorney, Agent, or Firm* — Benesch Friedlander Coplan & Aronoff LLP; Kraig K. Anderson

(57) ABSTRACT

A substrate coating method may include: translating the substrate in a first direction through a spray zone while spraying a fluid coating on a first uncoated surface portion to produce a first coated surface portion; heating at least the first coated surface portion to form a first cured coating while translating the substrate through the heating zone in the first direction and a second, opposite direction; manipulating a second uncoated surface portion in a position to be spray-coated; spraying the fluid coating onto the second uncoated surface portion while translating the substrate in the first direction through the spray zone to produce a second coated surface portion; and heating at least the second coated surface portion to form a second cured coating while translating the substrate in the first direction through the heating zone. The method may thereby provide the substrate with the first and second cured coatings.

19 Claims, 6 Drawing Sheets

PIPE PAINTING PROCESS

BACKGROUND

Coating exterior surfaces of large or heavy work pieces may be laborious, energy intensive, and time consuming. In a production process, throughput may be limited not only by coating time but also by cure time for the coating. For example, when coating the exterior surface of a pipe which is handled by its exterior surface, some provision may be made for curing at least a portion of a coated portion of the exterior surface before handling the pipe using the coated portion of the surface. A partly coated pipe may be set in a rack to dry or cure before coating the remainder of the surface, but this may require extra production steps, rack space, and the like. Curing temperatures may be increased and/or quicker-curing coatings may be applied, but this may limit the quality of the final coating and lead to increased energy or coating cost. It is desirable to provide a simple coating production process that may cure coatings quickly for ease in handling, and may also manage workload and energy consumption. The present application appreciates that managing such aspects of coating processes may be a challenging endeavor.

SUMMARY

In one embodiment, a method for coating a substrate is provided. The method may include translating the substrate in a first direction through a spray zone. The substrate may have a first uncoated surface portion. The method may also include spraying a fluid coating onto the first uncoated surface portion of the substrate to produce a first coated surface portion of the substrate. The spraying may be conducted while translating the substrate in the first direction through the spray zone. The method may further include heating at least the first coated surface portion to form a first cured coating of the substrate. The heating may be conducted while translating the substrate in the first direction through a heating zone. The heating may also be conducted while translating the substrate in a second direction substantially opposite the first direction through the heating zone. The method may also include continuing to translate the substrate in the second direction through the spray zone. The method may further include manipulating the substrate to place a second uncoated surface portion on the substrate in a position to be spray-coated, the position to be spray-coated being while translating the substrate in the first direction through the spray zone. The method may also include spraying the fluid coating onto the second uncoated surface portion of the substrate while translating the substrate in the first direction through the spray zone to produce a second coated surface portion of the substrate. The method may further include heating at least the second coated surface portion to form a second cured coating of the substrate while translating the substrate in the first direction through the heating zone. The method may thereby provide the substrate with the first and second cured coatings.

In another embodiment, a coated pipe is provided. The coated pipe may have an exterior surface substantially coated by the first and second cured coatings. The coated pipe may be produced according to the method provided above for coating the substrate, where the substrate is a pipe to be coated.

BRIEF DESCRIPTION OF THE DRAWINGS

The accompanying figures, which are incorporated in and constitute a part of the specification, illustrate example methods and systems, and are used merely to illustrate example embodiments.

DETAILED DESCRIPTION

Figure 1:
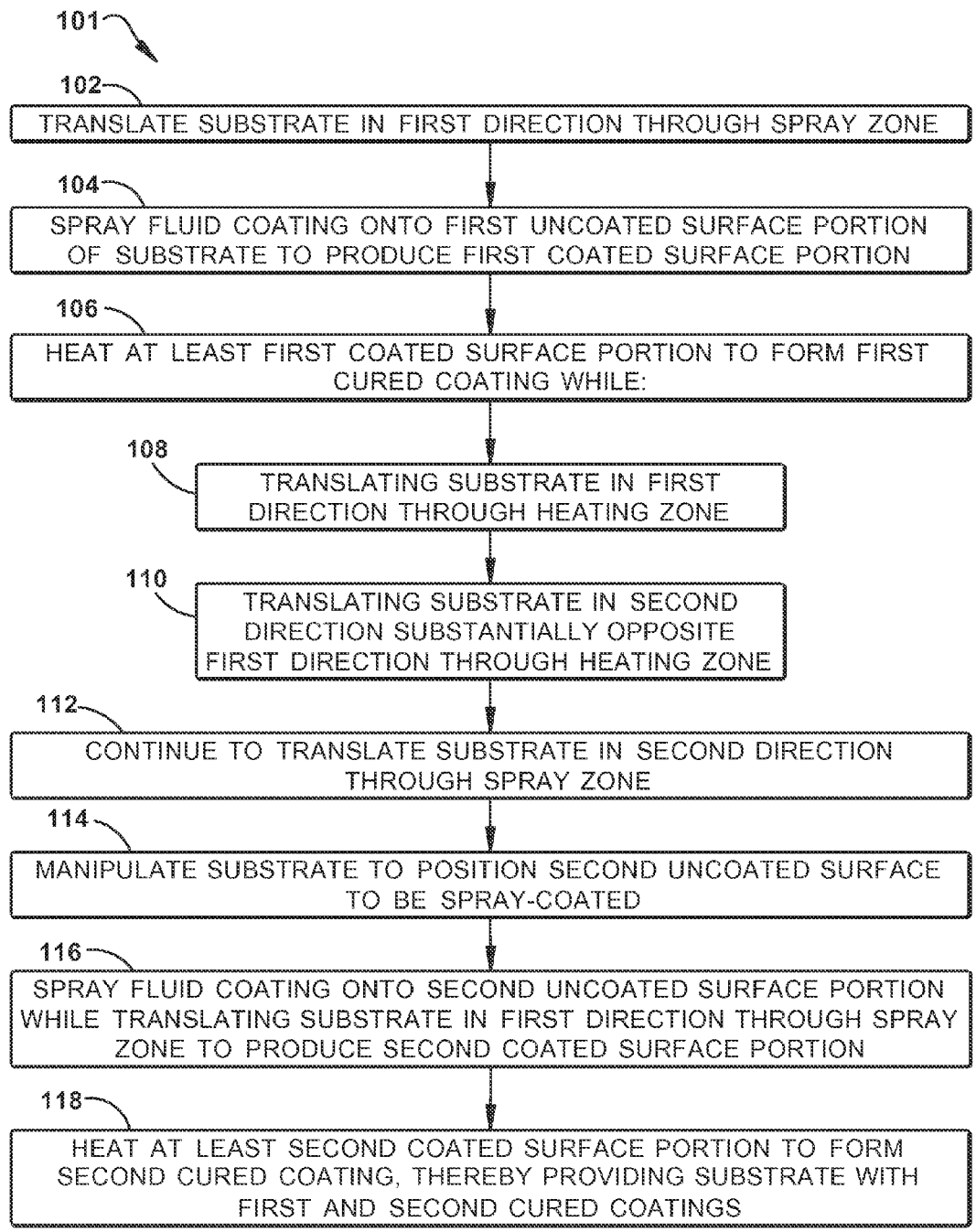
FIG. 1 is a flow diagram of an example method for coating a substrate.
Figure 2A:
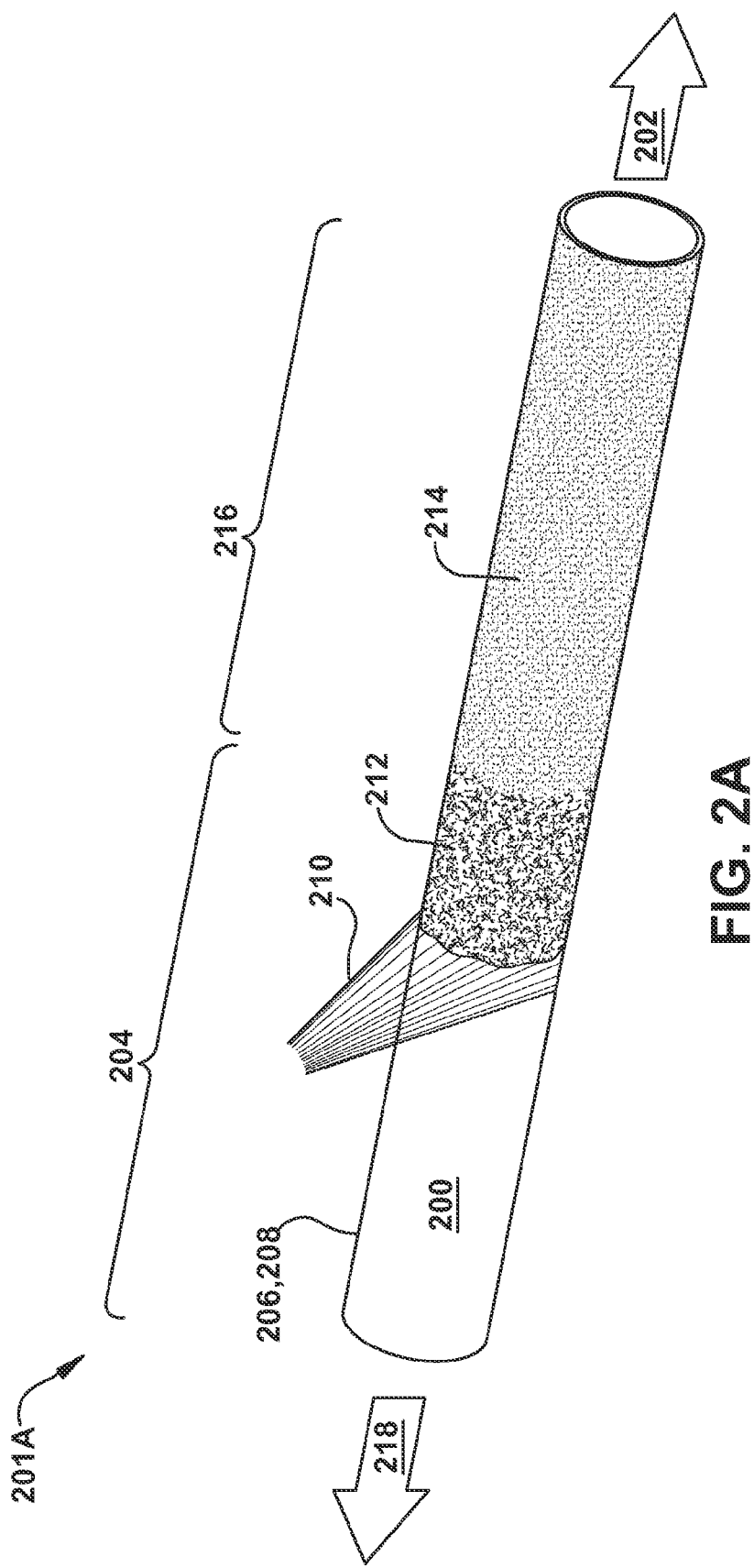
FIG. 2A is a diagram representing a side view of an example implementation of the method for coating the substrate.
Figure 2B:
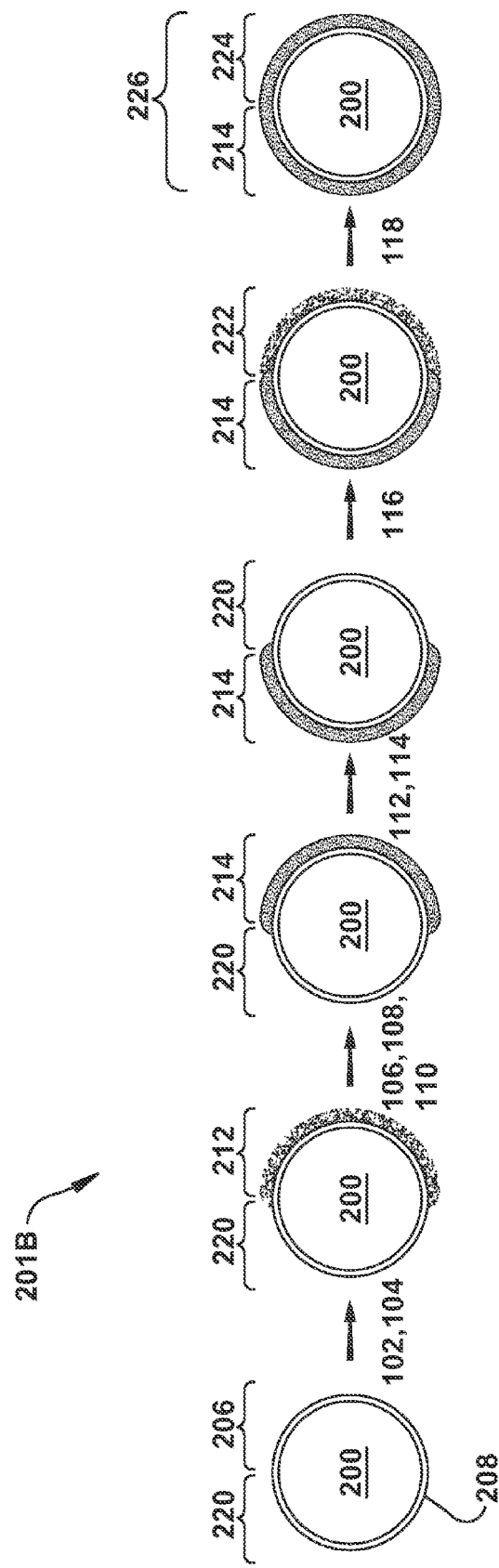
FIG. 2B is a diagram representing a series of corresponding cross-sectional views of the substrate in various states of the example implementation of the method for coating the substrate.

FIG. 1 is a flow diagram of an example method 101 for coating a substrate. FIG. 2A is a diagram representing a side view 201A of an example implementation of method 101 on a substrate 200. FIG. 2B is a diagram representing a series 201B of corresponding cross-section views of substrate 200 in various stages of the example implementation of method 101. For example, in FIG. 1, method 101 may include operation 102, "TRANSLATE SUBSTRATE IN FIRST DIRECTION THROUGH SPRAY ZONE." For example, referring to FIGS. 2A and 2B, substrate 200 may be translated in a first direction 202 through a spray zone 204. The substrate 200 may have a first uncoated surface portion 206 on exterior surface 208.

As depicted in FIG. 1, method 101 may also include operation 104, "SPRAY FLUID COATING ONTO FIRST UNCOATED SURFACE PORTION OF SUBSTRATE TO PRODUCE FIRST COATED SURFACE PORTION." For example, referring to FIGS. 2A and 2B, a fluid coating 210 may be sprayed onto first uncoated surface portion 206 of substrate 200 to produce a first coated surface portion 212 of substrate 200. The spraying may be conducted while translating substrate 200 in first direction 202 through spray zone 204.

Method 101 may further include operation 106, "HEAT AT LEAST FIRST COATED SURFACE PORTION TO FORM FIRST CURED COATING." For example, referring to FIGS. 2A and 2B, at least first coated surface portion 212 may be heated to form a first cured coating 214 of substrate 200. Operation 106 in method 101 may be conducted while carrying out operation 108, "TRANSLATING SUBSTRATE IN FIRST DIRECTION THROUGH HEATING ZONE." For example, referring to FIG. 2A, the heating may be conducted while translating substrate 200 in first direction 202 through a heating zone 216. Operation 106 in method 101 may be conducted while carrying out operation 110, "TRANSLATING SUBSTRATE IN SECOND DIRECTION SUBSTANTIALLY OPPOSITE FIRST DIRECTION THROUGH HEATING ZONE." For example, referring to FIG. 2A, the heating may also be conducted while translating substrate 200 in a second direction 218 substantially opposite first direction 202 through heating zone 216.

Method 101 may also include operation 112, "CONTINUE TO TRANSLATE SUBSTRATE IN SECOND DIRECTION THROUGH SPRAY ZONE." For example, referring to FIG. 2A, substrate 200 may continue to be translated in second direction 218 from heating zone 216 through spray zone 204. Operation 112 may be conducted without spraying coating 210.

Method 101 may further include operation 114, "MANIPULATE SUBSTRATE TO POSITION SECOND UNCOATED SURFACE TO BE SPRAY-COATED." For example, referring to FIGS. 2A and 2B, substrate 200 may be manipulated, e.g., by rotation. The manipulation may place a second uncoated surface portion 220 on substrate 200 in a position to be spray-coated. For example, the manipulation may include rotation of substrate 200 about the translation axes 202,218 to exchange the relative positions of second uncoated surface portion 220 and first cured coating 214. The positioning of substrate 200 such that second uncoated surface portion 220 may be spray-coated may be selected with respect to the spray zone 204. For example, second uncoated surface portion 220 may be spray-coated while translating substrate 200 in first direction 202 through spray zone 204.

Method 101 may also include operation 116, "SPRAY FLUID COATING ONTO SECOND UNCOATED SURFACE PORTION WHILE TRANSLATING SUBSTRATE IN FIRST DIRECTION THROUGH SPRAY ZONE TO PRODUCE SECOND COATED SURFACE PORTION." For example, referring to FIGS. 2A and 2B, fluid coating 210 may be sprayed onto second uncoated surface portion 220 of substrate 200 while translating substrate 200 in first direction 202 through spray zone 204 to produce a second coated surface portion 222 of substrate 200.

Method 101 may further include operation 118, "HEAT AT LEAST SECOND COATED SURFACE PORTION TO FORM SECOND CURED COATING, THEREBY PROVIDING SUBSTRATE WITH FIRST AND SECOND CURED COATINGS." For example, referring to FIGS. 2A and 2B, at least second coated surface portion 222 may be heated to form a second cured coating 224 of substrate 200 while translating substrate 200 in first direction 202 through heating zone 216. Method 100 may thereby provide coated substrate 226, including an exterior surface 208 coated by method 101, exterior surface 208 being substantially coated by the first and second cured coatings 214,224. Coated substrate 226 may be, for example, a coated pipe.

In various embodiments, first and second uncoated surface portions 206,220 may be located on exterior surface 208 of substrate 200. First and second coated surface portions 212, 222 may be located on exterior surface 208 of substrate 200. First and second cured coatings 214,224 may be located on an exterior surface 208 of substrate 200. In some examples, any of first and second uncoated surface portions 206,220, first and second coated surface portions 212,222, and first and second cured coatings 214,224 may extend to an interior surface of substrate 200, such as may occur by edge coating or overspray on a substrate 200 having an interior surface, such as a hollow pipe. In some examples, first and second cured coatings 214,224 may partly cover exterior surface 208 of substrate 200. First and second cured coatings 214,224 may substantially cover exterior surface 208 of substrate 200. First and second cured coatings 214,224 may completely cover exterior surface 208 of substrate 200.

Figure 3:
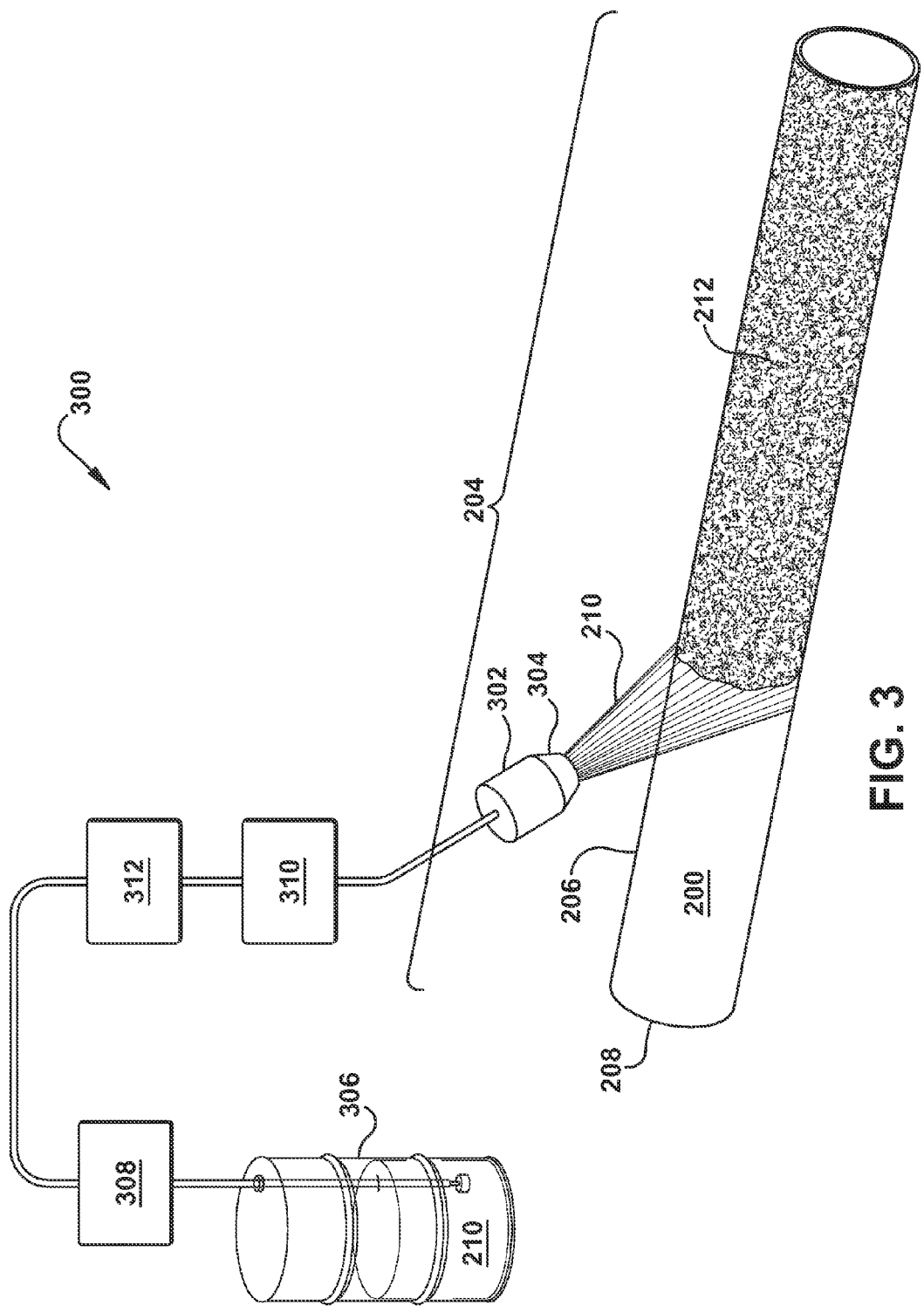
FIG. 3 is a diagram representing a side view of aspects of a spray zone employed in the example method for coating the substrate.

FIG. 3 is a diagram representing a side view 300 of aspects of spray zone 204 employed in example method 101 for coating substrate 200. In several examples of method 101, spraying the fluid coating 210 may include spraying the fluid coating 210 using a spray gun 302. Spraying the fluid coating 210 may include spraying the fluid coating 210 using a spray tip 304. For example, spraying fluid coating 210 may be accomplished using any conventional air assisted spray gun 302 such as a Graco G40 air assisted gun (Graco, Minneapolis Minn.), used with any suitable conventional spray tip 304, such as a 5/15 Rac X tip (Graco, Minneapolis Minn.). In some examples, spraying may atomize fluid coating 210. In some examples, spraying may not atomize fluid coating 210. In some examples, spray gun 302 may be manually operated. In some examples, spray gun 302 may be automatically operated by an electronic controller.

In some examples, method 101 may further include pressurizing the fluid coating 210 to a pressure of between about 14 MPa and about 28 MPa (between about 2000 pounds per square inch (psi) and about 4000 psi, airless) before or during the spraying. For example, fluid coating 210 may be pressurized to about 21 MPa (about 3000 psi airless). Pressurizing fluid coating 210 may be accomplished using any conventional industrial fluid pump 312, such as a Graco Merkur 30:1 Pump (Graco, Minneapolis Minn.).

In various examples, method 101 may further include heating the fluid coating 210 to a temperature of between about 50° C. and about 80° C. before or during the spraying. For example, fluid coating 210 may be heated to a temperature of about 65° C. Heating fluid coating 210 may be accomplished using any conventional industrial fluid heater 310, such as a Graco Viscon HP in line heater (Graco, Minneapolis Minn.). In some examples, fluid coating 210 may include a curing temperature, and fluid coating 210 may be heated to a temperature from about 20° C. to about 40° C. below a paint cure temperature. For example, a commercial fluid coating 210 rated by the manufacturer with a cure temperature of 95° C. may be heated to a temperature of between about 55° C. and about 75° C., e.g., about 65° C.

In various examples of method 101, spraying the fluid coating 210 may include independently applying each of the first and second coated surface portions at a wet thickness of between about 25 micrometers and about 150 micrometers (between about 1 mil and about 6 mils). For example, fluid coating 210 may applied as first and second coated surface portions 212,222 at a wet thickness of between about 75 micrometers and about 100 micrometers (between about 3 mils and about 4 mils). In some embodiments, the wet thickness may be about 75 micrometers (about 3 mils). The wet thickness may be selected according to characteristics of fluid coating 210 such as the pressure, temperature, solvent, dryer agent, and solids content, the temperature of heating zone 216, the speed of translation through heating zone 216, and the time in heating zone 216 to provide an effective drying or curing of first and second coated surface portions 212,222 to provide corresponding first and second cured coatings 214, 224. The wet thickness may be modified, for example, by selecting among available spray tips 304 and/or by modulating spray settings on air assisted spray gun 302, in view of the characteristics of fluid coating 210. The wet thickness may also be selected or modified in view of the heating time. In some examples, spray zone 204 may include a paint recycle system. In some examples, spray zone 204 may exclude a paint recycle system.

In several examples of method 101, fluid coating 210 may include one or more of an aromatic organic solvent and a siccative. As used herein, the "aromatic organic solvent" may include, for example, an aromatic organic compound such as benzene which may be unsubstituted or substituted with $C_1$-$C_4$ alkyl groups, halogen, hydroxy, $C_1$-$C_4$ alkoxy groups, $C_1$-$C_4$ alkanoyl groups, $C_1$-$C_4$ alkoxylate groups, nitro, $C_1$-$C_4$ haloalkyl groups, or a combination thereof. For example, the aromatic organic solvent may include benzene substituted with one methyl group, such as toluene, or two methyl groups, such as ortho, meta, or para xylene; or mixtures thereof. As used herein, a "siccative" is an oil drying agent, which may also be referred to in the art as a Japan drier. Siccatives may include metal-organic compounds that accelerate or catalyze hardening of drying oils, for example as used in oil-based paints. Siccatives may be derived from salts or coordination compounds of hydrocarbon carboxylates with metals, such as zirconium, zinc, calcium, cobalt, lead, manganese, iron, and the like.

Fluid coating 210 may include between about 20% and about 40% solids. Fluid coating 210 may be a zinc reinforced rust inhibiting primer. For example, fluid coating 210 may be a 30% solids, xylene based zinc reinforced rust inhibiting primer that includes a siccative. Fluid coating 210 may have a flash point of about 25° C. Fluid coating 210 may be provided in a reservoir 306, such as a 55 gallon (about 208 liter) drum as may be provided by a coating manufacturer. Fluid coating 210 may be withdrawn from reservoir 306 by any conventional means, such as by gravity or by siphoning using a mechanical extractor 308 such as a Graco Drum Elevator and Agitator (Graco, Minneapolis, Minn.).

Fluid coating 210 may be thinned or diluted from an initial fluid coating such as a commercial product using a suitable thinner, e.g., either a thinner recommended by the product manufacturer or the aromatic organic solvent described herein. Suitable initial fluid coatings include any quick dry solvent based coating, such as wood lacquers, vehicle lacquers, speed cure enamels, industrial primers, and the like, for example Cloverdale Industrial Phenolic Shop Primer (Product #: 71019, Cloverdale Paint, Surrey, British Columbia, Canada). For example, a suitable thinner may include the aromatic organic solvent, such as a mixture of xylene isomers. Fluid coating 210 may be thinned by combining 100 parts by volume of the commercial product with the thinner in parts by volume of between about 5 and 75, 10 and 65, 15 and 55, 20 and 45, 25 and 35, or any combination of the previous ranges. In many conventional coating methods, thinning may be expected to increase drying or curing time of a thinned coating. By contrast, thinning the initial fluid coating to form fluid coating 210 may surprisingly increase drying or curing speed when used in method 101 compared to using the initial fluid coating without thinning. Moreover, in some examples, the thinner may be used in contrast to manufacturer's directions for the commercial product, for example, using a greater amount of the thinner than recommended by the manufacturer's directions according to the parts by volume described above.

Substrate 200 may be coated using more than one fluid coating 210. For example, different fluid coatings 210 may be employed to form first and second coated surface portions 212,222. Substrate 200 may be coated to form more than one layer. For example, considering first and second cured coatings 214,224 as a first layer, a second or further layers may be applied to substrate 200 by repeating the described steps of the method as needed. The second or further layers may be coated using the same or a different fluid coating 210 as the first layer. For example, the first layer may be a primer coating and the second layer may be an enamel or epoxy outer coating, and the like.

In several examples of method 101, the heating may include subjecting the first coated surface portion 212 of the substrate 200 for a heating time of between about 4 minutes and about 12 minutes. The heating may substantially heat an exterior surface 208 of the substrate 200 within the heating zone 216. The heating may include heating an exterior surface 208 of the substrate 200 to a temperature of at least about 35° C. The heating may include applying between about 42 MJ (megajoules) and about 338 MJ (between about 40,000 British thermal units (BTU) and about 320,000 BTU) to an exterior surface 208 of the substrate 200. For example, in some embodiments the heating may include applying to exterior surface 208 of substrate 200 between about 84 MJ and about 252 MJ (between about 80,000 BTU and about 240,000 BTU), or between about 126 MJ and about 169 MJ (between about 120,000 BTU and about 160,000 BTU). For example, as depicted in cross-sectional view 401B in FIG. 4B, substrate 200 may be surrounded in heating zone 216 by a plurality of catalytic curing heaters 402, e.g., four 42 MJ (40,000 BTU) CATA-DYNE™ VX catalytic curing heaters (CCI Thermal Technologies, Inc., Edmonton, AB, Canada) for a total of about 169 MJ (about 160,000 BTU). Plurality of heaters 402 may be arranged in any suitable orientation, for example, equally spaced about first and second directions 202,218 with respect to substrate 200. For example, four heaters 402 may be arranged about first and second directions 202,218 with respect to substrate 200 in a regular square pattern or a diamond pattern, e.g., as depicted in FIG. 4B. In some examples, heating zone 216 may include a hot air recycle system. In some examples, heating zone 216 may exclude a hot air recycle system. Heating zone 216 may be run at a substantially consistent temperature or to apply heat at a substantially consistent rate throughout the described method. Heating zone 216 may be run at a different or varying temperature or to apply heat at a different or varying rate during the described method. For example, heating during the first translation in first direction 202 may be at the same temperature or heating rate as during the translation in second direction 218 and at a higher temperature or heating rate compared to the second translation in first direction 202.

Figure 4A:
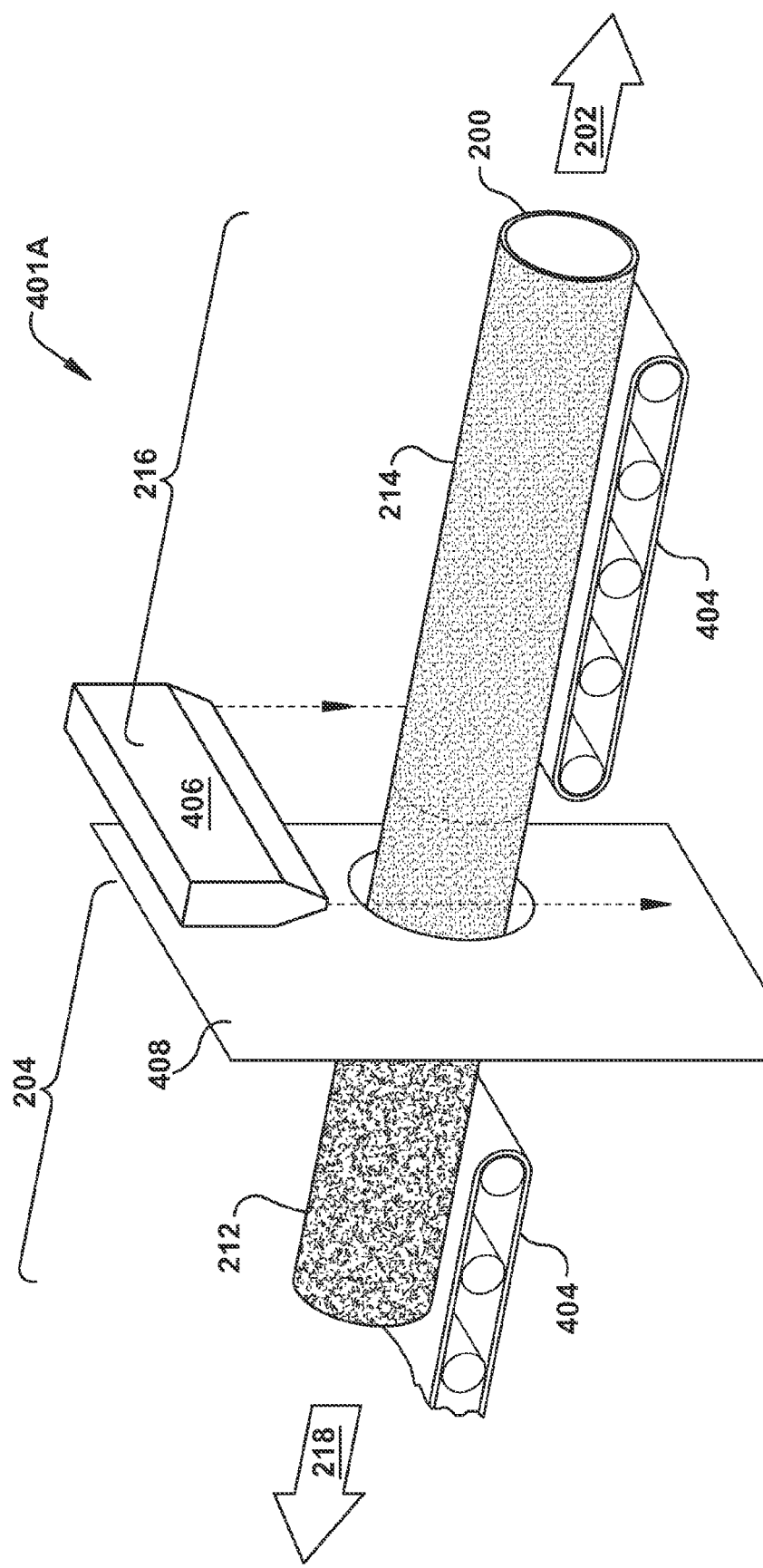
FIG. 4A is a diagram representing a side view of aspects of translating the substrate between the spray zone and a heating zone in the example method for coating the substrate.
Figure 4B:
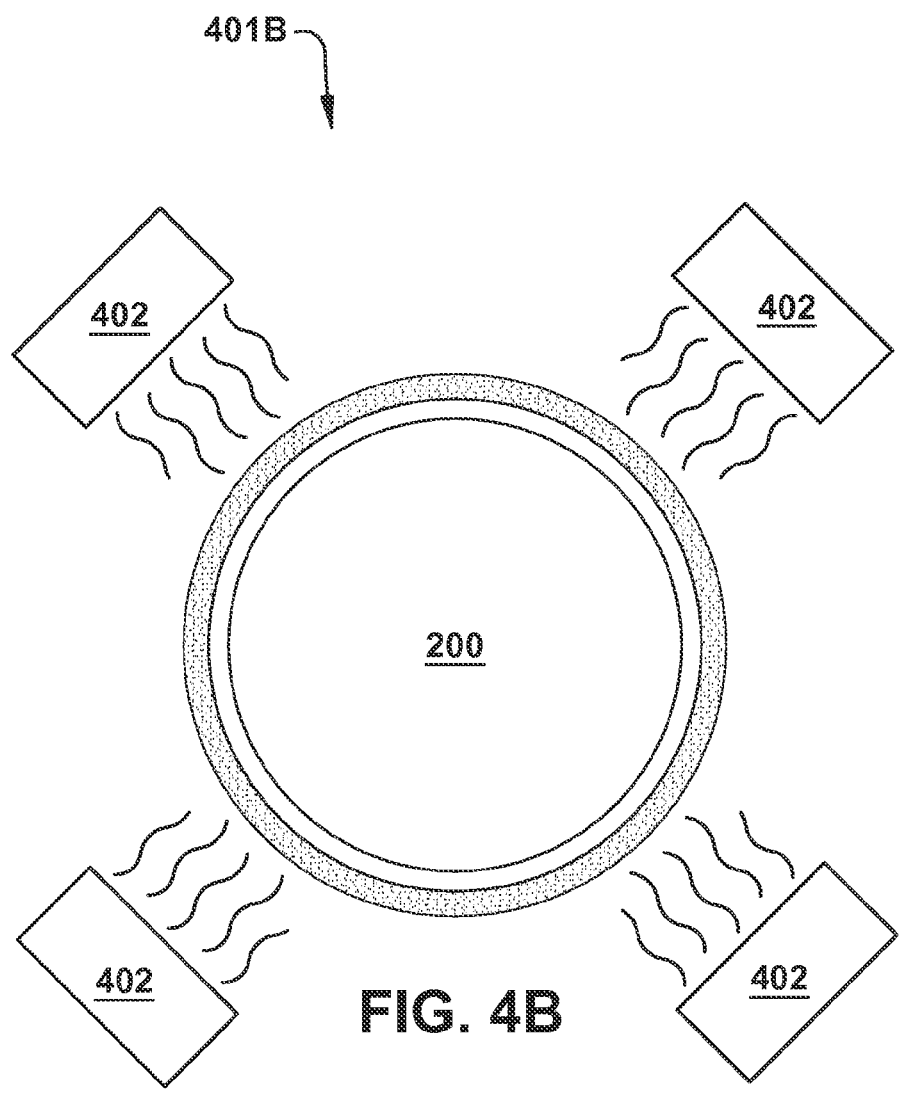
FIG. 4B is a diagram representing a cross-sectional view of aspects of the heating zone in the example method for coating the substrate.

As depicted, for example, in diagram 401A in FIG. 4A, translating the substrate 200 may include employing a translation mechanism 404 employing one or more of a roller conveyor and a belt conveyor. Translating the substrate 200 may be conducted using a translation mechanism 404 employing a variable drive system. Translating the substrate 200 may include translating at a speed of between about 1 meter per minute and about 5 meters per minute (between about 3 feet per minute and about 16 feet per minute). For example, substrate 200 may be translated at a speed of between about 1.5 meters per minute and about 3 meters per minute (between about 5 feet per minute and about 10 feet per minute).

In some examples, the speed of translation may be empirically adapted as needed to provide a desired surface temperature of substrate 200 based on the thickness and nature of the coating, the amount of heating applied, ambient temperature, and the like. For example, the translation speed may be adapted in view of the amount of heating and ambient temperature to heat substrate 200 to a temperature of at least about 35° C. In some examples, substrate 200 may be heated to a temperature of at least about 40° C., 45° C., 50° C., 55° C., 60° C., 65° C., 70° C., or 75° C. In some examples, substrate 200 may be heated to a temperature not exceeding 100° C., 90° C., 80° C., 70° C., 60° C., 50° C., or 40° C.

In several examples, the speed of translation may be empirically adapted as needed to provide a desired heating time based on the thickness and nature of the coating, the amount of heating applied, ambient temperature, surface temperature of substrate 200, and the like. For example, the translation speed may be adapted in view of the amount of heating and ambient temperature to provide substrate 200 with a time in heating zone 216 of about 2-8 minutes per pass through heating zone 216, about 3-6 minutes per pass through heating zone 216, or about 4 minutes per pass through heating zone 216.

In some examples, substrate 200 may pass through heating zone 216 at least three times: once on translating in first direction 202 immediately after spraying to form first coated surface portion 212; a second time upon translating back through heating zone 216 in second direction 218; and a third time upon translating again in first direction 202 immediately after spraying to form second coated surface portion 222. In some examples, each pass through heating zone 216 may take about 4 minutes such that: first coated surface portion 212 is heated to form first cured coating 214 for about 8 minutes or no more than about 8 minutes before spraying fluid coating 210 onto second uncoated surface portion 220 to produce second coated surface portion 222 of substrate 200. Second coated surface portion 222 may be heated to form second cured coating 224 for about 4 minutes or no more than about 4 minutes. In some examples, the two heating passes applied before spraying fluid coating 210 onto second uncoated surface portion 220 may cure first coated surface portion 212 sufficiently that first cured coating 214 may contact roller(s), belt(s), or other translation mechanism 404 parts while manipulating substrate 200 to place second uncoated surface portion 220 in a position to be spray-coated and while continuing to translate substrate 200. In some examples, the two heating passes applied before spraying fluid coating 210 onto second uncoated surface portion 220 may pre-heat substrate 200 sufficiently that the heating pass applied after spraying fluid coating 210 onto second uncoated surface portion 220 may be sufficient to cure second coated surface portion 222 to form second cured coating 224.

In some examples of method 101, the substrate 200 may be a metal pipe having an exterior surface 208. The first and second cured coatings 214,224 may substantially cover the exterior surface 208. In various examples, substrate 200 may be any material suitable for coating using the described method, such as metal, ceramic, wood, plastic, glass, and the like. In some examples, substrate 200 may be any shape suited to the described method, for example, sheets, blocks, beams, ingots, solid objects, hollow objects such as pipes, complex surfaces such as vehicle frames or panels, and the like. For example, substrate 200, e.g., a pipe, can be made of any suitable conventional metal or alloy, such as iron, steel, aluminum, copper, and the like. Substrate 200, e.g., a pipe, may be any conventional diameter, for example, from about 5 centimeters in diameter to about 2 meters in diameter, or in some examples between about 10 centimeters and about 95 centimeters. Substrate 200, e.g., a pipe, may be any conventional thickness, for example, from 1 millimeter in wall thickness up to 5 centimeters or more. Substrate 200, e.g., a pipe, may be in a single piece of any weight, for example, up to about 8, 9, 10, 11, or 12 tons per piece, or more.

In some examples of method 101, the substrate 200 may be a cylindrical pipe having a central axis substantially parallel to the first and second directions 202,218. Manipulating the substrate 200 to place the second uncoated surface portion 220 in a position to be spray-coated may include rotating the pipe about the central cylinder axis. For example, substrate 200 may be spun about the central axis effective to exchange places between first cured coating 214 and second uncoated surface portion 220. In some examples, substrate 200 may be rotated about the central axis by between about 90 and about 270 degrees, or in some examples, about 180 degrees. Substrate 200 may be manipulated manually, for example by hydraulically lifting on catchers, sliding wheels underneath and turning substrate 200 with a fork wrench. Substrate 200 may be also manipulated semiautomatically or automatically, for example using hydraulically raised motorized wheels configured to spin substrate 200 about the central axis.

As depicted, for example, in diagram 401A in FIG. 4A, method 101 may further include separating the spray zone 204 from the heating zone 216 with a high velocity air curtain delivered from an air barrier apparatus 406. For example, any conventional air barrier apparatus 406 may be employed to separate spray zone 204 from heating zone 216, such as an Enershield Air Barriers high velocity air curtain (Enershield Industries Ltd., Edmonton, AB, Canada). Air barrier apparatus 406 may be employed alone, or in conjunction with physical barrier 408, or physical barrier 408 may be employed alone. For example, physical barrier 408 may be constructed of a sheet of appropriate material such as metal, wood, etc., and may have an opening for substrate 200, e.g., a circle when substrate 200 is a pipe. Substrate 200 may be translated in either first direction 202 or second direction 218 past air barrier apparatus 406 and/or physical barrier 408. Air barrier apparatus 406 and/or physical barrier 408 may at least partly separate the heat of heating zone 216 from fluid coating 210 in spray zone 204, and vice versa.

In some examples, the atmosphere in spray zone 204 and/or heating zone 216 may be dehumidified. In some examples, spray zone 204 and/or heating zone 216 may exclude dehumidification.

In various examples, method 101 may further include preparing substrate 200 to accept fluid coating 210. For example, substrate 200 may be prepared by drying. Substrate 200 may be prepared by cleaning, e.g., washing, pressure washing, bead blasting or sand blasting. Substrate 200 may be prepared by etching, e.g., using a rust remover. Substrate 200 may be prepared by preheating, e.g., by translating through heating zone 216 before spraying fluid coating 210 to form the first coated surface portion 212, for example, to heat the surface of substrate 200 to match the temperature of fluid coating 210. In some examples, the method may exclude preparing substrate 200 to accept fluid coating 210.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the terms "coupled" or "operatively connected" are used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, and the like. As a non-limiting example, each range discussed herein can be readily broken down into a lower third, middle third and upper third, and the like. As will also be understood by one skilled in the art all language such as "up to," "at least," "greater than," "less than," include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The various aspects and embodiments disclosed herein are for purposes of illustration and are not intended to be limiting, with the true scope and spirit being indicated by the following claims.

The invention claimed is:

1. A method for coating a substrate, comprising:
    translating the substrate in a first direction through a spray zone, the substrate having a first uncoated surface portion;
    spraying a fluid coating onto the first uncoated surface portion of the substrate to produce a first coated surface portion of the substrate while translating the substrate in the first direction through the spray zone;
    heating at least the first coated surface portion to form a first cured coating of the substrate while:
        translating the substrate in the first direction through a heating zone; and
        translating the substrate in a second direction substantially opposite the first direction through the heating zone;
    continuing to translate the substrate in the second direction through the spray zone;
    manipulating the substrate to place a second uncoated surface portion on the substrate in a position to be spray-coated;
    spraying the fluid coating onto the second uncoated surface portion of the substrate while translating the substrate in the first direction through the spray zone to produce a second coated surface portion of the substrate; and
    heating at least the second coated surface portion to form a second cured coating of the substrate while translating the substrate in the first direction through the heating zone,
    thereby providing the substrate with the first and second cured coatings.

2. The method of claim 1, further comprising heating the fluid coating to a temperature of between about 50° C. and about 80° C. before or during the spraying.

3. The method of claim 1, further comprising pressurizing the fluid coating to a pressure of between about 14 MPa and about 28 MPa before or during the spraying.

4. The method of claim 1, wherein spraying the fluid coating comprises spraying the fluid coating using a spray gun.

5. The method of claim 1, wherein spraying the fluid coating comprises spraying the fluid coating using a 5/15 tip.

6. The method of claim 1, wherein spraying the fluid coating comprises independently applying each of the first and second coated surface portions at a wet thickness of between about 25 micrometers and about 150 micrometers.

7. The method of claim 1, wherein the fluid coating comprises one or more of an aromatic organic solvent and a siccative.

8. The method of claim 1, wherein the fluid coating comprises between about 20% and about 40% solids.

9. The method of claim 1, wherein the fluid coating is a zinc reinforced rust inhibiting primer.

10. The method of claim 1, wherein the heating comprises subjecting the first coated surface portion of the substrate for a heating time of between about 4 minutes and about 12 minutes.

11. The method of claim 1, wherein the heating substantially heats an exterior surface of the substrate within the heating zone.

12. The method of claim 1, wherein the heating comprises heating an exterior surface of the substrate to a temperature of at least about 35° C.

13. The method of claim 1, wherein the heating comprises applying between about 42 MJ and about 338 MJ to an exterior surface of the substrate.

14. The method of claim 1, wherein translating the substrate comprises employing a translation mechanism employing one or more of a roller conveyor and a belt conveyor.

15. The method of claim 1, wherein translating the substrate comprises a translation mechanism employing a variable drive system.

16. The method of claim 1, wherein translating the substrate comprises translating at a speed of between about 1 meter per minute and about 5 meters per minute.

17. The method of claim 1, wherein the substrate is a metal pipe having an exterior surface, the first and second cured coatings substantially covering the exterior surface.

18. The method of claim 1, wherein the substrate is a cylindrical pipe having a central cylinder axis substantially parallel to the first and second directions, and manipulating the substrate to place the second uncoated surface portion in a position to be spray-coated comprises rotating the pipe about the central cylinder axis.

19. The method of claim 1, further comprising separating the spray zone from the heating zone with a high velocity air curtain.

* * * * *